US009600391B2

(12) United States Patent
Hasegawa

(10) Patent No.: US 9,600,391 B2
(45) Date of Patent: Mar. 21, 2017

(54) OPERATIONS MANAGEMENT APPARATUS, OPERATIONS MANAGEMENT METHOD AND PROGRAM

(75) Inventor: Hideo Hasegawa, Tokyo (JP)

(73) Assignee: NEC Corporation, Tokyo (JP)

(*) Notice: Subject to any disclaimer, the term of this patent is extended or adjusted under 35 U.S.C. 154(b) by 941 days.

(21) Appl. No.: 13/381,013

(22) PCT Filed: Aug. 2, 2011

(86) PCT No.: PCT/JP2011/068007
§ 371 (c)(1),
(2), (4) Date: Dec. 27, 2011

(87) PCT Pub. No.: WO2012/029500
PCT Pub. Date: Mar. 8, 2012

(65) Prior Publication Data
US 2012/0191442 A1 Jul. 26, 2012

(30) Foreign Application Priority Data
Sep. 1, 2010 (JP) ................................. 2010-195761

(51) Int. Cl.
G06F 17/50 (2006.01)
G06F 9/44 (2006.01)
G06F 11/34 (2006.01)

(52) U.S. Cl.
CPC ...... G06F 11/3447 (2013.01); G06F 11/3409 (2013.01); G06F 2201/81 (2013.01)

(58) Field of Classification Search
None
See application file for complete search history.

(56) References Cited

U.S. PATENT DOCUMENTS 7,444,263 B2* 10/2008 White et al. ................. 702/180
7,457,732 B2* 11/2008 Aragones et al. ............... 703/2
(Continued)

FOREIGN PATENT DOCUMENTS

EP 1 895 416 A1 3/2008
JP 2005-18689 A 1/2005
(Continued)

OTHER PUBLICATIONS

International Search Report (ISR) (PCT Form PCT/ISA/210) dated Aug. 30, 2011, for PCT/JP2011/068007, and partial English translation.
(Continued)

Primary Examiner — Omar Fernandez Rivas
Assistant Examiner — Nithya J Moll
(74) Attorney, Agent, or Firm — McGinn IP Law Group, PLLC

(57) ABSTRACT

A correlation model generation unit generates a plurality of correlation models each expressing correlations between different types of performance values in a predetermined period, which are stored in a performance information unit. A model setting unit selects, from among the plurality of correlation models generated by the correlation model generation unit, a basic model which is a correlation model showing the highest fitting degree and one or more specific models which are correlation models other than the basic model, on the basis of a fitting degree of each of the correlation models for the performance information in the predetermined period, and sets time periods on which the basic model and the specific models are applied respectively to failure detection.

22 Claims, 16 Drawing Sheets

(56) References Cited

U.S. PATENT DOCUMENTS

| | | | |
|---|---|---|---|
| 8,175,863 B1* | 5/2012 | Ostermeyer et al. | 703/22 |
| 2003/0033120 A1* | 2/2003 | Chiou | 702/188 |
| 2003/0139905 A1* | 7/2003 | Helsper et al. | 702/182 |
| 2007/0005296 A1 | 1/2007 | Beresniewicz et al. | |
| 2009/0217099 A1 | 8/2009 | Kato | |
| 2010/0205483 A1 | 8/2010 | Ishiou | |

FOREIGN PATENT DOCUMENTS

| | | |
|---|---|---|
| JP | 2005-327261 A | 11/2005 |
| JP | 2008-108154 A | 5/2008 |
| JP | 2009-199533 A | 9/2009 |

OTHER PUBLICATIONS

Extended European Search Report dated Jul. 9, 2015.

* cited by examiner

Fig.4

| TIME | MONITORED APPARATUS 200a (WEB SERVER) CPU UTILIZATION (%) | MONITORED APPARATUS 200b (DATABASE SERVER) DISK REQUEST (/SEC) | MONITORED APPARATUS 200b (DATABASE SERVER) CPU UTILIZATION (%) | ... |
|---|---|---|---|---|
| 2010/6/1(TUE) 10:00 | 15 | 300 | 32 | |
| 2010/6/1(TUE) 10:05 | 18 | 361 | 35 | |
| 2010/6/1(TUE) 10:10 | 22 | 425 | 41 | |
| 2010/6/1(TUE) 10:15 | 20 | 398 | 40 | |
| .. | .. | .. | .. | .. |
| 2010/6/6(SUN) 10:00 | 2 | 1200 | 20 | |
| 2010/6/6(SUN) 10:05 | 3 | 2400 | 40 | |
| 2010/6/6(SUN) 10:10 | 2 | 800 | 12 | |
| 2010/6/6(SUN) 10:15 | 2 | 200 | 3 | |
| .. | | | | .. |

Fig.9

| MODEL NAME | MODEL TYPE | APPLICATION DATE | APPLICATION SCHEDULE |
|---|---|---|---|
| M1 | BASIC MODEL | 6/1,2,3,4,5, 7,8,9,10,11,12, 14,15,16,17,18,19, 21,22,23,24,25,26, 28,29,30 | (EVERY DATE EXCEPT FOR APPLICATION SCHEDULE FOR SPECIFIC MODEL) |
| M6 | SPECIFIC MODEL | 6/6,13,20,27 | SUNDAYS |

Fig.11

| RULE NUMBER | CLASSIFICATION RULE |
|---|---|
| 1 | MONDAYS |
| 2 | TUESDAYS |
| : | : |
| 7 | SUNDAYS |
| 8 | SATURDAYS AND SUNDAYS |
| 9 | LAST WEEKDAY OF EACH MONTH |
| 10 | FIRST WEEKDAY OF EACH MONTH |
| 11 | DAYS OF MULTIPLES OF 5 (GOTOHBI) |
| : | : |
| 20 | 25TH OF EACH MONTH (PAYDAY) |
| 21 | SEPTEMBER 20 (DATE OF CLOSING THE FIRST ACCOUNTING PERIOD) |
| 22 | MARCH 20 (DATE OF CLOSING THE SECOND ACCOUNTING PERIOD) |
| : | : |

Fig.16

| MODEL NAME | MODEL TYPE | APPLICATION DATE | APPLICATION SCHEDULE | APPLICATION TIME |
|---|---|---|---|---|
| M1 | BASIC MODEL | 6/1,2,3,4,5, 7,8,9,10,11,12, 14,15,16,17,18,19, 21,22,23,24,25,26, 28,29,30 | (DATES OTHER THAN APPLICATION SCHEDULE FOR SPECIFIC MODEL) | (TIME OTHER THAN APPLICATION TIME FOR EXCEPTIONAL MODEL) |
| M1.1 | EXCEPTIONAL MODEL | | | 06:00~08:00 |
| M6 | SPECIFIC MODEL | 6/6,13,20,27 | SUNDAYS | |

OPERATIONS MANAGEMENT APPARATUS, OPERATIONS MANAGEMENT METHOD AND PROGRAM

TECHNICAL FIELD

The present invention relates to an operations management apparatus, an operations management method and a program, and in particular, to an operations management apparatus, an operation management method and a program which perform system modeling by using time series information on system performance.

BACKGROUND ART

Patent literature 1 discloses an example of an operations management system which performs system modeling by using time series information on system performance and detects a failure of the system by using the generated model.

The operations management system disclosed in patent literature 1 generates a correlation model including a plurality of correlation functions, by deriving a correlation function with respect to every pair between pieces of performance information on plurality of performance items based upon time series information of the performance information on a plurality of performance types of the system. Then, the operations management system determines whether the correlations are destructed or not by using the generated correlation model, with respect to actual measurement values of performance information, and detects an abnormality of the system based upon the number of occurrences of correlation destruction.

In the operations management system disclosed in patent literature 1, when generating a correlation model, time series information on performance information during a predetermined period of time is inputted and correlations are extracted based upon the time series information in that period.

By the way, in many systems, because the number of processing servers and executed applications are changed depending on the time slot of system operation, the system characteristics also change, and the correlations between pieces of performance information vary according to the characteristics. Due to this, a time period (modeling period) of the time series information used to generate a correlation model needs to be set appropriately according to times of change in the system characteristics. Further, when analyzing the system, it is necessary to use a correlation model according to the system characteristics of the time slot during which the analysis is performed.

For example, the type of processes performed by accounting systems changes between daytime and nighttime such as that they perform on-line transaction processes in the daytime and batch processes at night. With respect to such accounting systems, it is necessary to generate respective correlation models for daytime and nighttime, on the basis of respective series of performance information for daytime and nighttime, and to change the correlation model to be used in the system analysis between daytime and nighttime.

Thus, in order to perform modeling and analysis according to the system characteristics, it is necessary to have the information on a modeling period with respect to each of a plurality of system characteristics the system has.

Such information on a modeling period is grasped, for example, by an administrator with sufficient knowledge about the system, and the administrator sets a modeling period for which a correlation model is generated.

However, when such information on a modeling period is not available, due to the reason such as that an administrator with sufficient knowledge about the system does not exit, for example, and thereby a correlation model is generated with respect to incorrect modeling period and is applied to a system analysis, an abnormality of the system is incorrectly detected (as misinformation) despite that the system is in normal operation, due to that the correlations between pieces of performance information varies depending on the time slot.

Additionally, when a system analysis is performed using a correlation model, during a time slot where the system characteristics are different from that in the modeling period of the correlation model, an abnormality of the system is incorrectly detected (as misinformation) similarly, due to that the correlations between pieces of performance information in the time slot of the analysis is different from that in the modeling period.

For example, with respect to the above-mentioned accounting systems, when a correlation model generated on the basis of series of performance information in the daytime is applied to a system analysis in the nighttime, an abnormality of the system (misinformation) is reported to an administrator even if batch processes are normally performed, due to the variation in the correlations established in the system.

As described above, when information on the modeling period is not available with respect to each of a plurality of system characteristics the system has, an inaccurate model may be generated, or a model inappropriate for the time slot of the system analysis may be applied. Due to that, there is a possibility that degradation in accuracy of the analysis, missing of a failure in the analysis or misinformation on a failure occur.

As a related art, patent literature 2 discloses an operations information management system, wherein correlation coefficients are calculated between performance information and model data of monitored targets, and only the correlation coefficients are stored with respect to the performance information showing strong correlation.

CITATION LIST

Patent Literature

[Patent Literature 1] Japanese Patent Application Laid-Open No. 2009-199533
[Patent Literature 2] Japanese Patent Application Laid-Open No. 2008-108154

SUMMARY OF INVENTION

Technical Problem

When a correlation model for a system analysis is generated on the basis of time series information on system performance like in the modeling technique disclosed in patent literature 1 described above, there has been a problem that the information on modeling period is necessary with respect to each of a plurality of system characteristics the system has.

The objective of the present invention is to solve the above-described problem and consequently to provide an operations management apparatus, an operations management method and a program which generate a correlation model which is appropriate for a system analysis with respect to each of fixed periods such as the date on which the system analysis is performed, even if the information on modeling periods with respect to system characteristics is not available.

Solution to Problem

An operations management apparatus according to an exemplary aspect of the invention includes performance information storage means for storing performance information including a plurality of types of performance values in a system, in chronological order, correlation model generation means for generating a plurality of correlation models each including correlations between different types of performance values in a predetermined period, which performance values are stored in the performance information storage means, and model setting means for selecting, from among the plurality of correlation models generated by the correlation model generation means, a basic model which is a correlation model showing the highest fitting degree and one or more specific models which are correlation models other than the basic model on the basis of a fitting degree of each of the correlation models for the performance information in the predetermined period, and setting time periods on which the basic model and the one or more specific models are applied respectively to failure detection.

An operations management method according to an exemplary aspect of the invention includes storing performance information including a plurality of types of performance values in a system, in chronological order, generating a plurality of correlation models each including correlations between different types of performance values in a predetermined period, selecting, from among the plurality of correlation models, a basic model which is a correlation model showing the highest fitting degree and one or more specific models which are correlation models other than the basic model on the basis of a fitting degree of each of the correlation models for the performance information in the predetermined period, and setting time periods on which the basic model and the one or more specific models are applied respectively to failure detection.

A computer readable storage medium according to an exemplary aspect of the invention, records thereon a operations management program, causing a computer to perform a method including storing performance information including a plurality of types of performance values in a system, in chronological order; generating a plurality of correlation models each including correlations between different types of performance values in a predetermined period, selecting, from among the plurality of correlation models, a basic model which is a correlation model showing the highest fitting degree and one or more specific models which are correlation models other than the basic model on the basis of a fitting degree of each of the correlation models for the performance information in the predetermined period, and setting time periods on which the basic model and the one or more specific models are applied respectively to failure detection.

Advantageous Effect of Invention

The advantageous effect of the present invention is that a correlation model which is appropriate for a system analysis can be generated with respect to each of fixed periods such as the dates on which the system analysis is performed, even if the information on modeling periods with respect to system characteristics is not available.

BRIEF DESCRIPTION OF DRAWINGS

FIG. 4 A table showing an example of performance series information 121 in the first exemplary embodiment of the present invention.

FIG. 9 A table showing an example of model information 123 in the first exemplary embodiment of the present invention.

FIG. 11 A table showing an example of schedule candidates information 124 in the first exemplary embodiment of the present invention.

FIG. 16 A table showing an example of model information 123 in the second exemplary embodiment of the present invention.

DESCRIPTION OF EMBODIMENTS

First Exemplary Embodiment

Next, a first exemplary embodiment of the present invention will be described.

Figure 2:
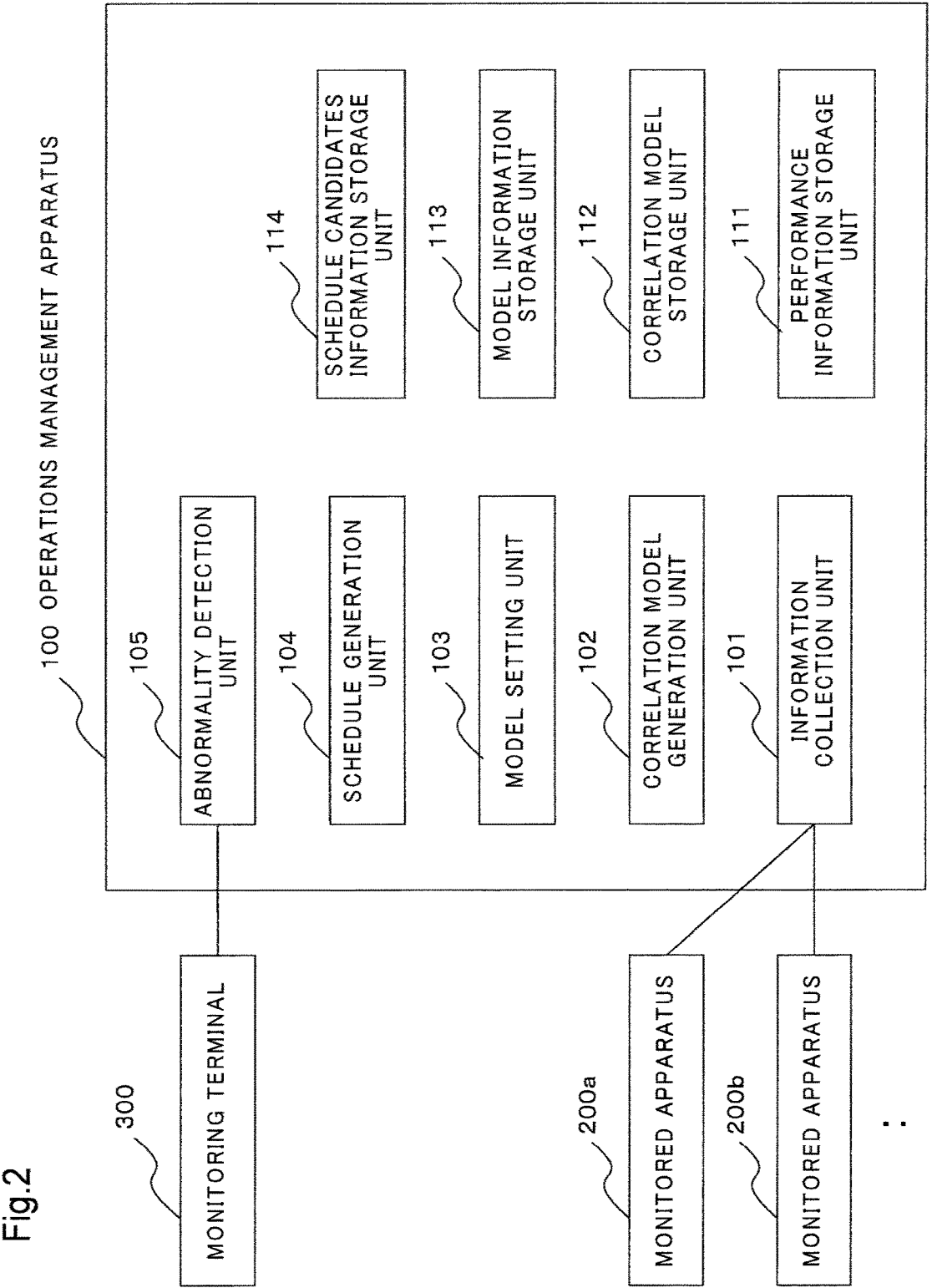
FIG. 2 A block diagram showing a configuration of an operations management system to which an operations management apparatus in the first exemplary embodiment of the present invention is applied.

First, a configuration of the first exemplary embodiment of the present invention will be described. FIG. 2 is a block diagram showing a configuration of an operations management system to which an operations management apparatus in the first exemplary embodiment of the present invention is applied.

As shown in FIG. 2, an operations management system in the first exemplary embodiment of the present invention includes an operations management apparatus (monitoring and controlling apparatus) 100, monitored apparatuses 200 (200a and 200b) and a monitoring terminal 300.

Here, based upon the performance information collected from the monitored apparatuses 200, which are monitoring targets, the operations management apparatus 100 generates correlation models 122 with respect to the monitored apparatuses 200, and performs failure detection with respect to the monitored apparatuses 200 utilizing the generated correlation models 122.

The monitored apparatuses 200 are apparatuses (systems) such as web servers and database servers which are modeled and monitored by the operations management apparatus 100.

A monitoring terminal 300 is a terminal, for an administrator and the like, to order the operations management apparatus 100 to generate correlation models 122 and detect a failure with respect to the monitored apparatuses 200.

The operations management apparatus 100 includes an information collection unit 101, correlation model generation unit 102, model setting unit 103, schedule generation unit 104, abnormality detection unit 105, performance information storage unit 111, correlation model storage unit 112, model information storage unit 113 and schedule candidates information storage unit 114.

Here, the information collection unit 101 collects, from the monitored apparatuses 200, performance series information 121 which indicates chronological variation of the performance information of the monitored apparatuses 200. The performance information storage unit 111 stores performance series information 121 collected by the information collection unit 101. Here, the performance series information 121 includes, as performance information, values for the performance items (performance values) such as CPU utilization, memory usage and the number of disk accesses, which are measured on the monitored apparatuses 200 at regular intervals.

Here, a combination of each of the monitored apparatuses 200 and a performance item is defined as a performance type (or just a type) in performance information.

FIG. 4 is a table showing an example of performance series information 121 in the first exemplary embodiment of the present invention. In the example shown in FIG. 4, the performance series information 121 includes the CPU utilization of the monitored apparatus 200a, the number of disk accesses of the monitored apparatus 200b and the CPU utilization of the monitored apparatus 200b, as the performance types.

The correlation model generation unit 102 refers to the performance series information 121, and generates a correlation model 122 with respect to each date included in the performance series information 121. Here, with respect to each date included in the performance series information 121, the correlation model generation unit 102 derives a correlation function between the performance values for arbitrary two performance types, and generates a correlation model 122 including correlation functions with respect to every pair of performance types. The correlation model storage unit 112 stores the correlation model 122 generated by the correlation model generation unit 102.

Here, the correlation function is a transform function to predict a time-series of the performance values of another performance type from a time-series of the performance values of one performance type, and is derived, as indicated in patent literature 1, by the system identification process with respect to the time-series of the performance values for the above-described arbitrary two performance types.

Figure 7:
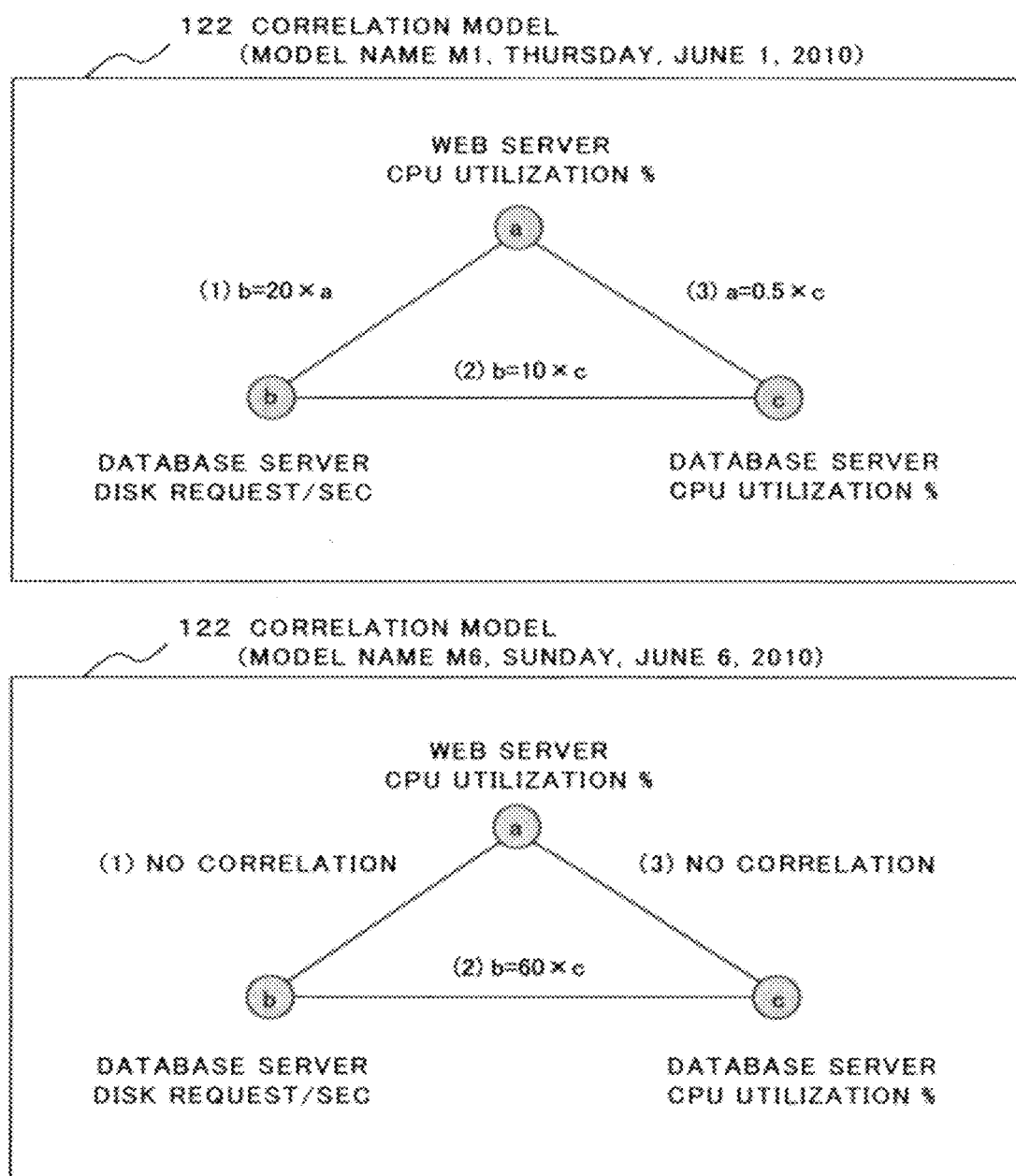
FIG. 7 A diagram showing examples of a correlation model 122 in the first exemplary embodiment of the present invention.

FIG. 7 is a diagram showing examples of the correlation model 122 in the first exemplary embodiment of the present invention. In the examples shown in FIG. 7, a correlation model 122 is generated with respect to each date. In the respective correlation models 122, correlation functions have been calculated with respect to pairs of performance types of the performance values among three performance types, which are the CPU utilization of the web server, the number of disk accesses of the database server and the CPU utilization of the database server. Further, transform functions such as $y=Ax$ are employed as the correlation functions.

In addition, calendrical day is set as a temporal unit (hereinafter, referred to as a fixed period) for which the correlation model 122 is generated in the first exemplary embodiment of the present invention, but calendrical week or month may be set as the fixed period. Further, the fixed period is not limited to such cyclic period as day, week and month, but may be a specific time slot predefined by an administrator.

The model setting unit 103 extracts, from among the plurality of correlation models 122 generated by the correlation model generation unit 102, a basic model which fits the performance information during a predetermined period of the performance series information 121 and a specific model which fits the performance information for a specific date within the predetermined period of the performance series information 121, and determines the dates on which each of the basic and specific model is applied to a system analysis (failure detection).

Here, in the first exemplary embodiment of the present invention, whether a correlation model 122 fits the performance information or not is determined on the basis of a fitting degree for the correlation model 122 with respect to the performance information.

The model setting unit 103 selects a correlation model 122 showing the highest fitting degree in the predetermined period as a basic model, and selects a predetermined number of correlation models 122 showing the lowest fitting degree in the predetermined period as specific models. Then, the model setting unit 103 assigns the date, within the predetermined period, for which the fitting degree of a specific model is higher than that of the basic model and the fitting degree of each of the other specific models as the date on which the specific model is applied.

By this way, because a failure detection process employing the basic model showing high fitting degree over the predetermined period is performed during normal time, and a failure detection process employing a model showing higher fitting degree than the basic model is performed on a specific date, it is possible to reduce the frequency of incorrect detection of a failure (misinformation) on such a specific date on which the system characteristics are different form that during the normal state, compared to the case a single model is employed over the predetermined period.

Note that, in the first exemplary embodiment of the present invention, it is assumed that the fitting degree is determined according to a correlation destruction rate in the application of a correlation model 122 to performance information. Additionally, it is assumed that the smaller the correlation destruction rate is, the higher the fitting degree is.

The model information storage unit 113 stores the model information 123 presenting the model name and the dates on which the model is applied, with respect to each of the basic model and specific models generated by the model setting unit 103.

FIG. 9 is a table showing an example of model information 123 in the first exemplary embodiment of the present invention. The model information 123 includes a model name, a model type, an application date and an application schedule. Here, the model name indicates the identifier to identify the correlation model 122. The model type indicates that the model 122 is either of a basic model or a specific model. The application date and application schedule indicate the date and schedule, respectively, on which the model is applied.

The schedule candidates information storage unit 114 stores schedule candidates information 124 which is a list of classification rules to classify the application dates on which each of the basic model and the specific models is applied (the fixed periods on which each of the basic model and the specific models is applied) according to calendrical attributes (temporal attributes).

FIG. 11 is a table showing an example of the schedule candidates information 124 in the first exemplary embodiment of the present invention. In the schedule candidates information 124 in the example shown in FIG. 11, predetermined days of the week such as "Mondays" and "Sundays", predetermined days of every month such as "the days of multiples of 5" and "the last weekday of each month", and predetermined months and dates of every year such as "March 20" are set as classification rules. As these classification rules, the rules which enable classification of the specific dates influencing the system characteristics of the monitored system are set.

The schedule generation unit 104 determines application schedules for the specific models, on the basis of the application dates for the specific models determined by the model setting unit 103 and the schedule candidates information 124.

The abnormality detection unit 105 applies each of the basic model and specific models, determined by the model setting unit 103, to the performance information included in the performance series information 121 according to the corresponding application date or application schedule, and, by comparing the performance information with that predicted by those models, performs failure detection on the system and outputs the results to the monitoring terminal 300.

Note that, the operations management apparatus 100 may be a computer which includes a CPU (Central Processing Unit) and a storage medium storing a program and operates under the control according to the program. Further, the performance information storage unit 111, the correlation model storage unit 112, the model information storage unit 113 and the schedule candidates information storage unit 114 may be configured either as independent storage mediums or in a single storage medium.

Next, operation of the operations management apparatus 100 in the first exemplary embodiment of the present invention will be described.

Figure 3:
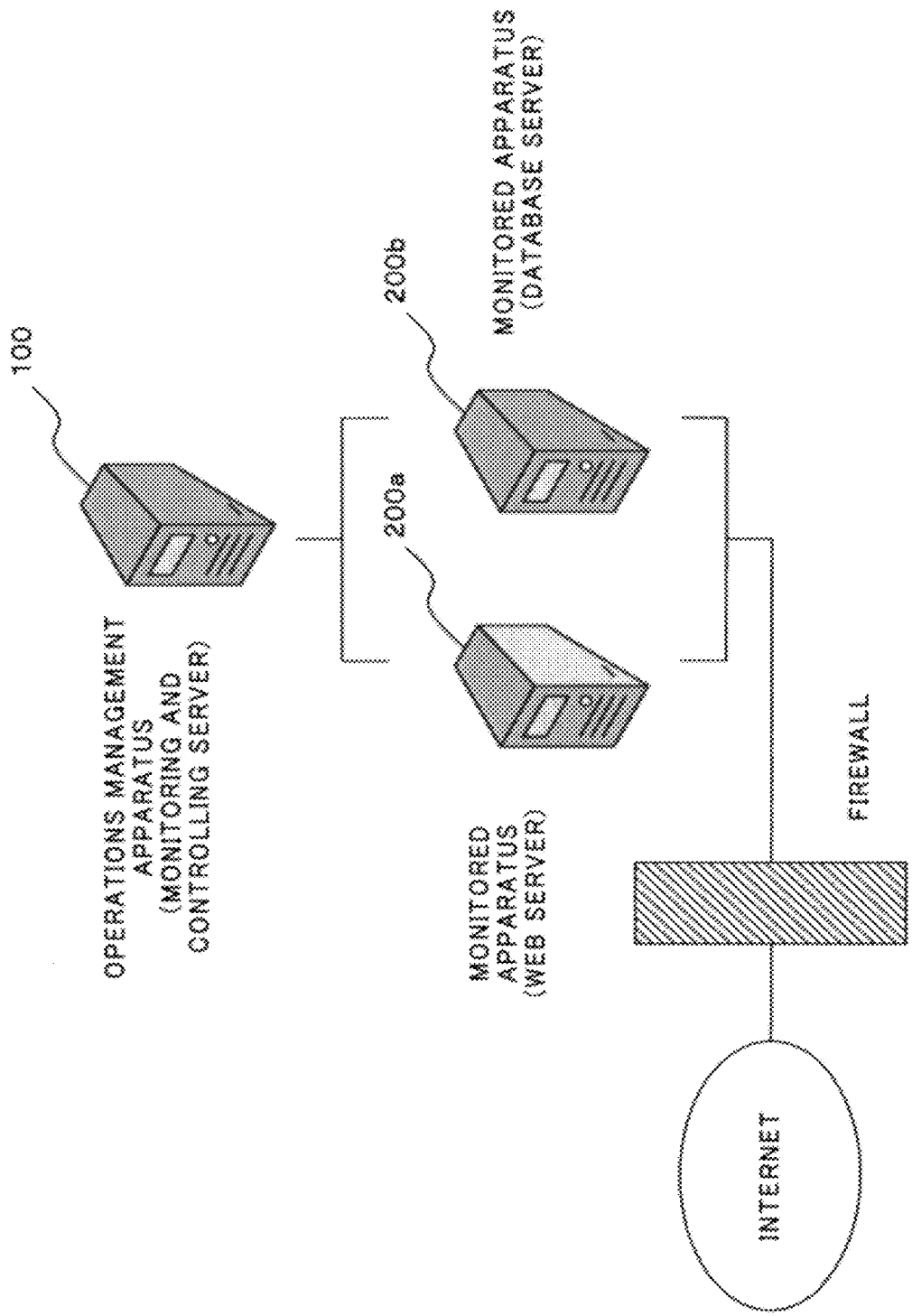
FIG. 3 A diagram showing an example of an operations management system to which the operations management apparatus in the first exemplary embodiment of the present invention is applied.

FIG. 3 is a diagram showing an example of an operations management system to which the operations management apparatus 100 in the first exemplary embodiment of the present invention is applied. In the example shown in FIG. 3, the monitored apparatuses 200a and 200b are a web server and a database server, respectively.

In each of the monitored apparatuses 200a and 200b, a monitoring and controlling agent operates, acquires performance information every 5 minutes and sends it to the information collection unit 101 of the operations management apparatus (monitoring and controlling apparatus) 100 at regular intervals. Accordingly, performance series information 121 such as shown in FIG. 4 is stored in the performance information storage unit 111 of the operations management apparatus 100.

Here, on weekdays, the web server and database server execute online transactions in response to the accesses from clients via a firewall. On holidays, accesses from clients are blocked out by the firewall, and each of the web server and database server performs batch processes, for example, such as a backup and counting. Due to this, in the performance series information 121 shown in FIG. 4, the performance information on Tuesday, June 1, which is a weekday, is different in its tendency from that on Sunday, June 6, which is a holiday.

Figure 5:
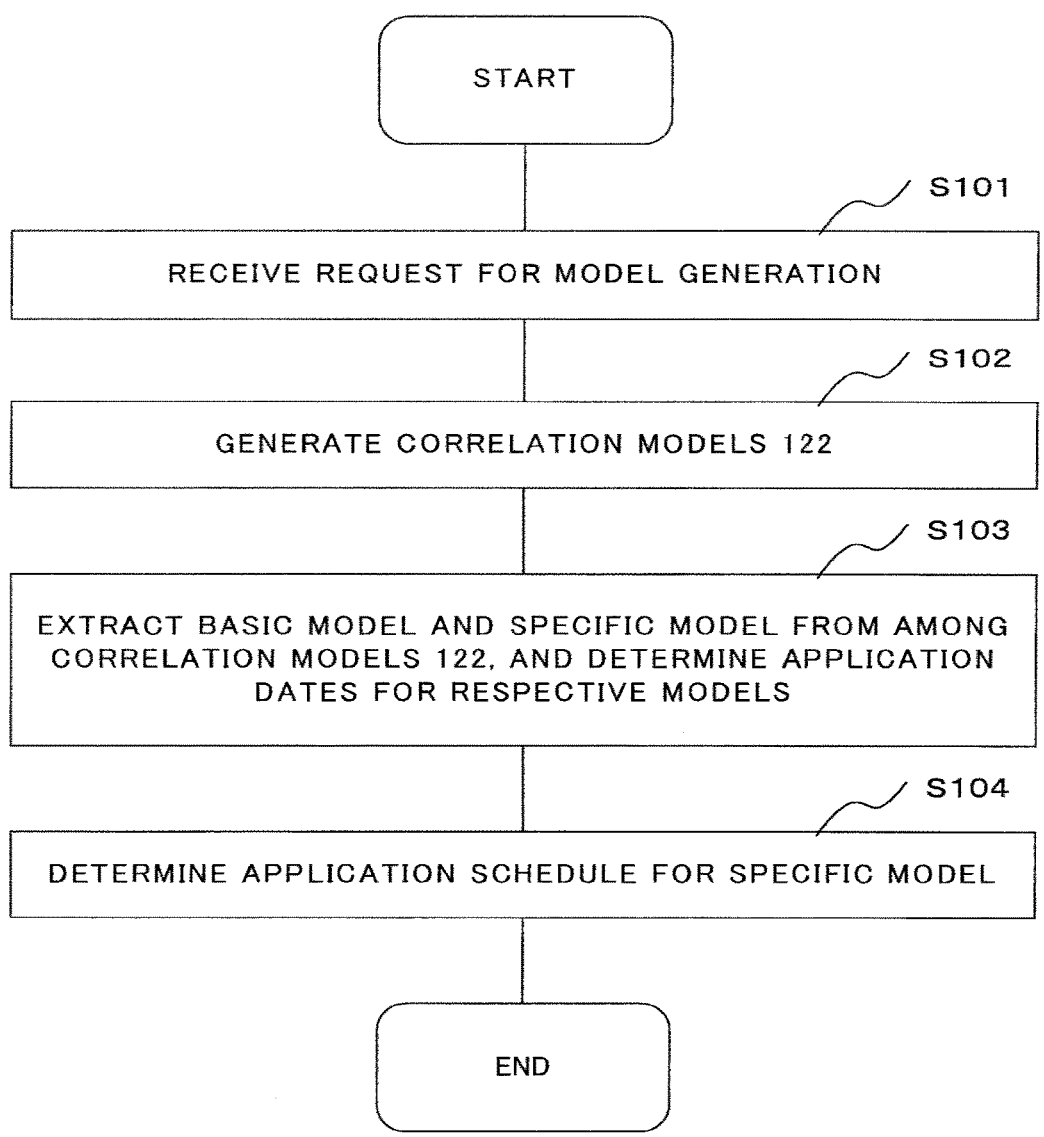
FIG. 5 A flow chart showing a general process of the operations management apparatus 100 in the first exemplary embodiment of the present invention.

FIG. 5 is a flow chart showing a general process of the operations management apparatus 100 in the first exemplary embodiment of the present invention.

First, the operations management apparatus 100 receives a request for model generation from the monitoring terminal 300 (Step S101). Here, the monitoring terminal 300 designates a period (a predetermined period) for the performance information to be used to generate models from among the performance information included in the performance series information 121, and the number of specific models (a predetermined number of models) to be generated.

For example, the monitoring terminal 300 designates June 1 to 30 as the period for the performance information to be used to generate models, and 1 as the number of specific models to be generated.

The correlation model generation unit 102 refers to the performance series information 121 stored in the performance information storage unit 111, generates the correlation models 122 with respect to each of the dates (fixed periods) in the designated period, on the basis of the performance information for the dates included in the performance series information 121, and stores the models in the correlation model storage unit 112 (step S102) (correlation model generation process).

For example, the correlation model generation unit 102 generates the correlation models 122 shown in FIG. 7 using the performance information from 0:00 to 23:55 for each date from June 1 to 30 of June in the performance series information 121 shown in FIG. 4, and stores the models in the correlation model storage unit 112. Here, the model names of the correlation models 122 for the respective dates are designated as M1, M2 . . . and M30.

In FIG. 7, the correlation model 122 with the model name M1 is an example of the correlation model 122 in the above-described case where online transactions are executed on a weekday. The correlation model 122 with the model name M6 is an example of the correlation model 122 in the case where batch processes are executed on a holiday.

Next, the model setting unit 103 extracts each of a basic model and specific models from among the correlation models 122 stored in the correlation model storage unit 112, and determines the application dates for the respective models (Step S103) (model extraction process).

Figure 6:
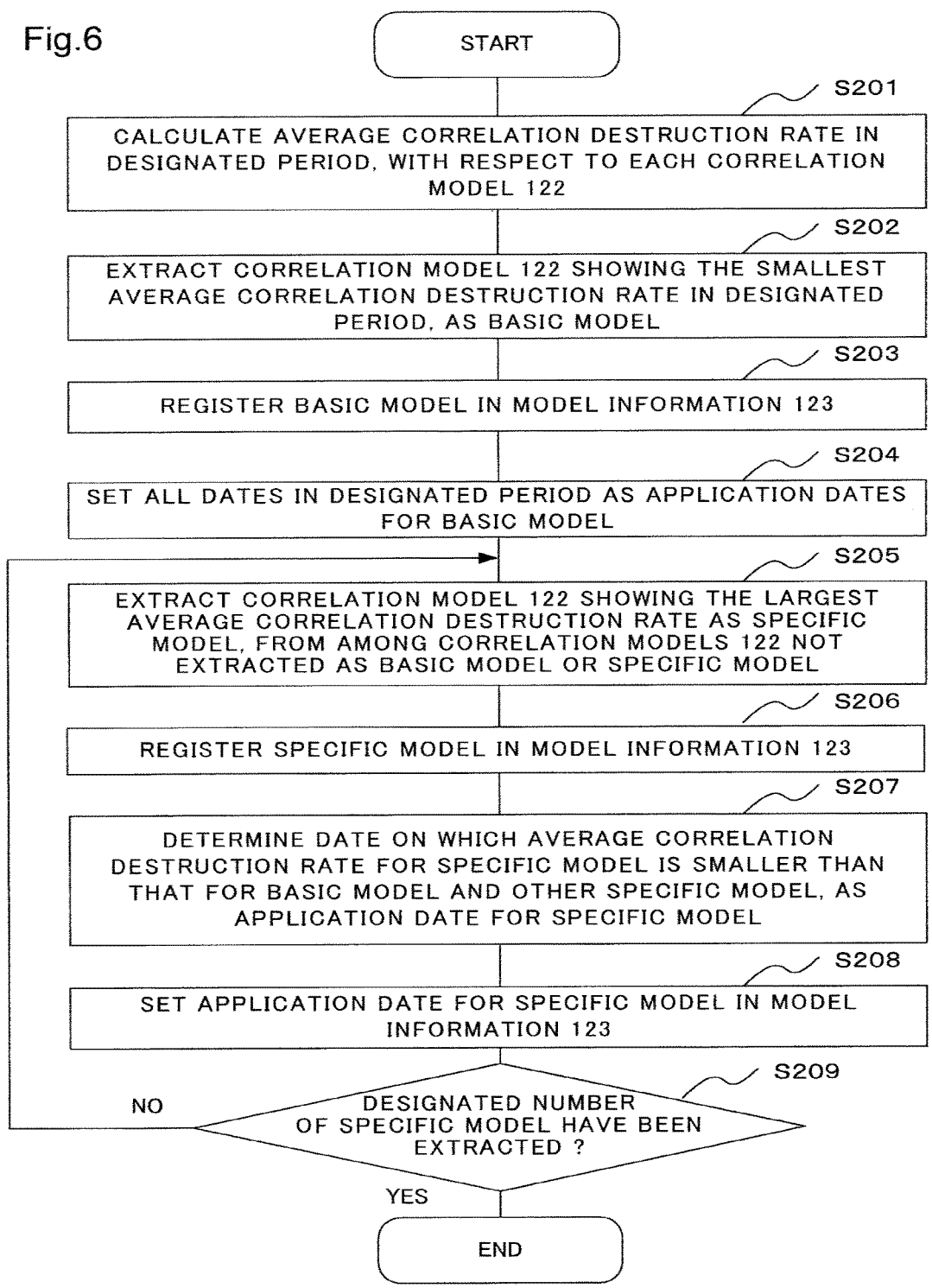
FIG. 6 A flow chart showing a model extraction process of the operations management apparatus 100 in the first exemplary embodiment of the present invention.

FIG. 6 is a flow chart showing the model extraction process (details of Step S103) of the operations management apparatus 100 in the first exemplary embodiment of the present invention.

The model setting unit 103 calculates, with respect to each correlation model 122 generated in step S102, an average correlation destruction rate of the correlation model in the designated period, on the basis of the performance information for the designated period included in the performance series information 121 stored in the performance information storage unit 111 (step S201).

Here, the model setting unit 103 calculates a correlation destruction rate, for example, by means of the same method as that in patent literature 1.

That is, the model setting unit 103 applies a correlation function included in the correlation model 122 to the performance values for one of the two performance types included in the performance series information 121, calculates a predictive performance values for the other performance type, and calculates a prediction error by comparing the actual performance values for the other performance type with the calculated predictive performance values. If the calculated prediction error exceeds a value set by an administrator or the like in advance (a predetermined value), the model setting unit 103 detects it as correlation destruction.

Then, the model setting unit 103 detects existence or nonexistence of correlation destruction with respect to every correlation function (correlation) included in the correlation model 103, and calculates a correlation destruction rate based upon the number of destructed correlations against the number of whole correlations included in the correlation model 122.

Further, the model setting unit 103 calculates an average correlation destruction rate for the designated period, by calculating an average value of the calculated correlation destruction rates in the designated period.

Next, the model setting unit 103 extracts a correlation model 122 showing the smallest average correlation destruction rate in the designated period (a correlation model with the highest average fitting degree in the designated period) from among the correlation models 122 generated in step S102, as a basic model (step S202).

The model setting unit 103 registers the model name of the correlation model 122 extracted as a basic model in the model information 123 stored in the model information storage unit 113 (step S203).

The model setting unit 103 sets all dates in the designated period as the application dates of the basic model (step S204).

Figure 8:
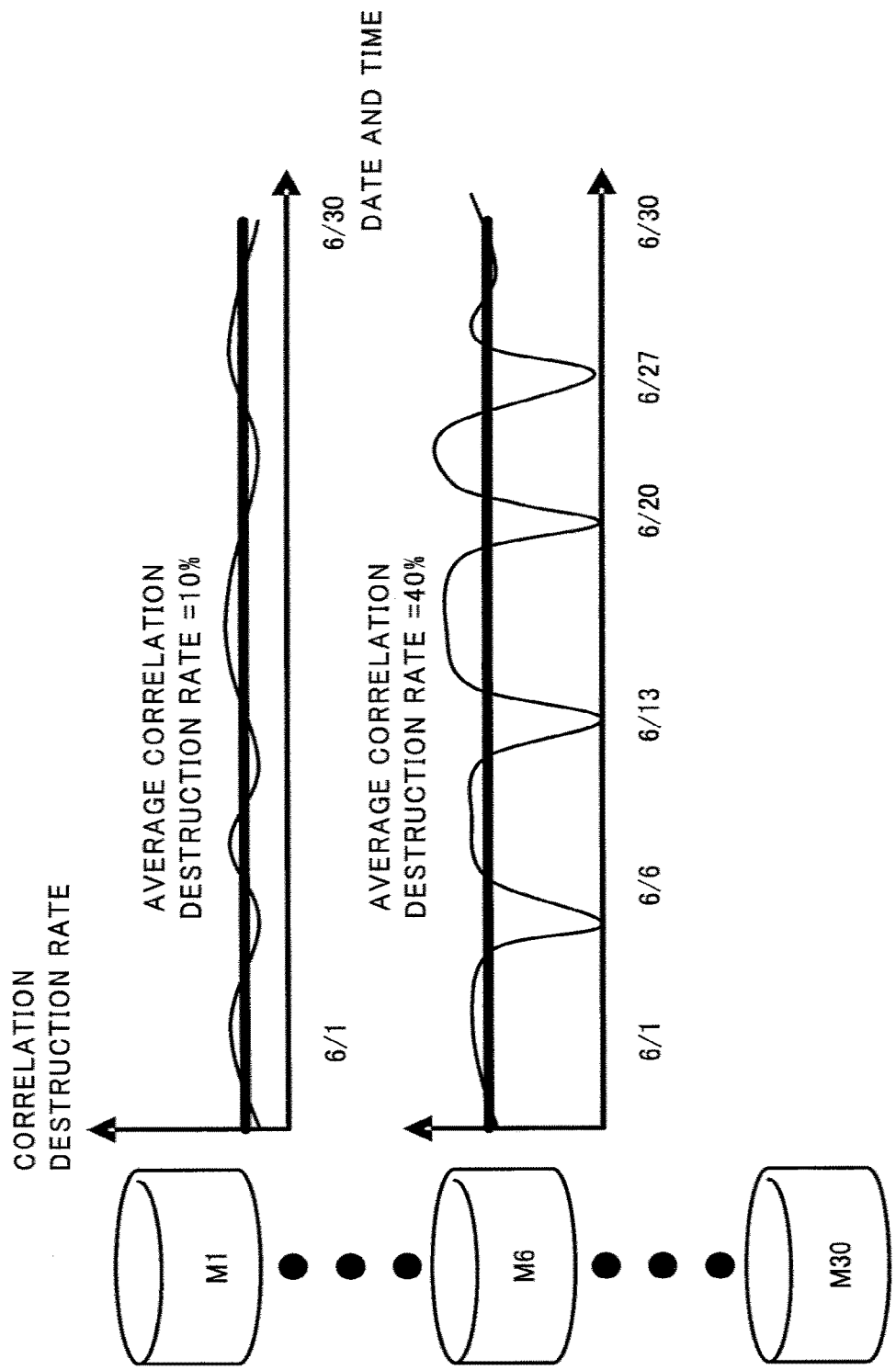
FIG. 8 A diagram showing calculation results of an average correlation destruction rate in the first exemplary embodiment of the present invention.

FIG. 8 is a diagram showing calculation results of the average correlation destruction rate in the first exemplary embodiment of the present invention. Here, for example, when the value of 10% for the average correlation destruction rate for the correlation model 122 with the model name M1 in the period June 1 to 30 is smallest among the values for that for every correlation model 122 (model name M1 to M30), the model setting unit 103 extracts the correlation model 122 with the model name M1 as a basic model and registers it in the model information 123 as shown in FIG. 9. The model setting unit 103 sets each of the dates in the period June 1 to 30 as the application dates of the basic model.

Next, the model setting unit 103 extracts a correlation model 122 showing the largest average correlation destruction rate in the designated period (a correlation model with the lowest average fitting degree in the designated period) from among the correlation models 122 generated in step S102 and not extracted yet as either a basic model or a specific model, as a specific model (step S205).

The model setting unit 103 registers the model name of the correlation model 122 extracted as a specific model in the model information 123 stored in the model information storage unit 113 (step S206).

Next, the model setting unit 103 calculates an average correlation destruction rate for each date included in the designated period, with respect to each of the extracted basic and specific models, on the basis of the performance information for each date included in the performance series information 121 stored in the performance information storage unit 111. Then, the model setting unit 103 determines the date on which the average correlation destruction rate for the specific model extracted in step S205 is smaller than that for the basic model and that for each of other specific models (the date on which the average fitting degree for the specific model is higher than that for the basic model and that for each of other specific models), among from dates included in the designated period, as an application date for the specific model (step S207).

Here, the model setting unit 103 calculates an average correlation destruction rate for each date, by calculating an average value of the correlation destruction rates calculated by the aforementioned method for each date.

The model setting unit 103 sets the determined application dates for the specific model in the model information 123, and removes the dates from the application dates already set for the basic model or other specific models (step S208).

The model setting unit 103 repeats steps S205 to S208 until the designated number of specific models are extracted (step S209).

For example, when the value of 40% for the average correlation destruction rate for the correlation model 122 with the model name M6 in the period June 1 to 30 is largest among the values for that for the correlation models 122 not extracted yet (model names M2 to M30), the model setting unit 103 extracts the correlation model 122 with the model name M6 as a specific model and registers it in the model information 123, as shown in FIG. 9.

When the average correlation destruction rate for the correlation model with the model name M6 is smaller than that for the basic model, with respect to the dates 6th, 13th, 20th and 27th of June, the model setting unit 103 sets these dates as the application dates for the specific model with the model name M6 in the model information 123, as shown in FIG. 9. Further, as shown in FIG. 9, the model setting unit 103 removes these dates from the application dates for the basic model (June 1 to 30).

Consequently, as shown in FIG. 9, the basic model (model name M1) and specific model (model name M6) and the application dates for the respective models are set in the model information 123.

As a result, with respect to the performance information during the period used for the model generation, the abnormality detection unit 105 can perform failure detection on a system, by applying the basic and specific models set in the model information 123 to the respective application dates.

Next, the schedule generation unit 104 determines an application schedules for the specific models, based upon the application dates and schedule candidates information 124 (step S104) (schedule generation process).

Figure 10:
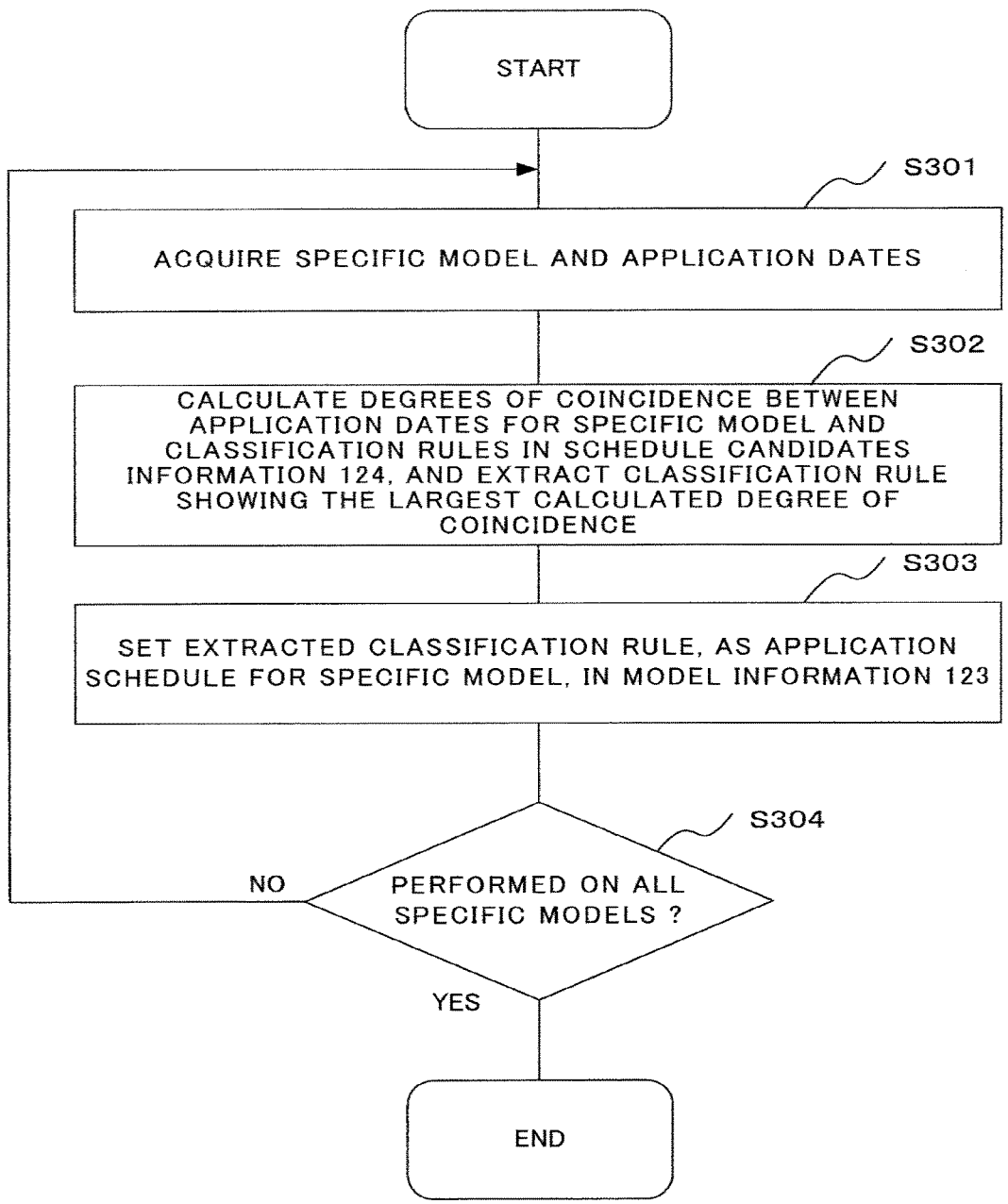
FIG. 10 A flow chart showing a schedule generation process of the operations management apparatus 100 in the first exemplary embodiment of the present invention.

FIG. 10 is a flow chart showing the schedule generation process (details of step S104) of the operations management apparatus 100 in the first exemplary embodiment of the present invention.

Here, schedule candidates information 124 such as in FIG. 11 is stored in the schedule candidates information storage unit 114.

Referring to the model information 113 stored in the model information storage unit 113, the schedule generation unit 104 acquires one of the specific models and its application dates (step S301).

The schedule generation unit 104 calculates a degree of coincidence between the application dates for the specific model and each of the classification rules included in the schedule candidates information 124 referring to the schedule candidates information 124 stored in the schedule candidates information storage unit 114, and extracts a classification rule for which the calculated degree of coincidence is largest (step S302).

Here, the schedule generation unit 104 calculates the degree of coincidence by means of the following equation, for example.

$$\text{degree of coincidence} = n(|A \cup B|)/n(|A \cap B|)$$

Here, A, B and n( ) express a set of application dates for the specific model, a set of the dates corresponding to a classification rule for the designated period, and the number of elements included in the set in ( ), respectively.

The schedule generation unit 104 sets the extracted classification rule to the model information 123 stored in the model information storage unit 113, as an application schedule for the specific model (step S303).

The schedule generation unit 104 repeats steps S302 and S303 for every specific model extracted in step S103 (step S304).

Figure 12:
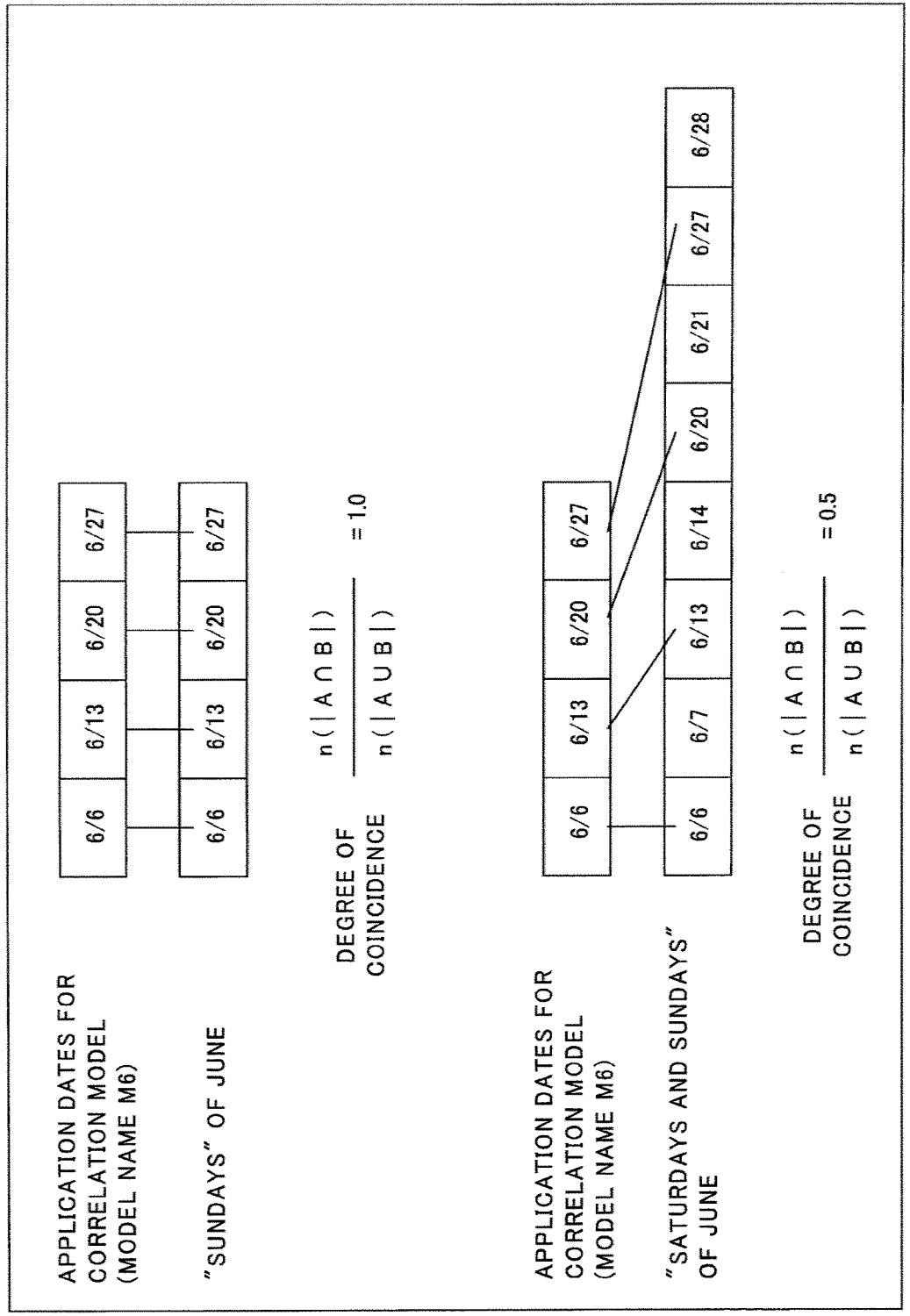
FIG. 12 A diagram showing examples of the calculation results of degrees of coincidence in the first exemplary embodiment of the present invention.

FIG. 12 is a diagram showing examples of the calculation results of degrees of coincidence in the first exemplary embodiment of the present invention.

For example, the schedule generation unit 104 calculates, with respect to the specific model with the model name M6 included in the model information 123 in FIG. 9, a degree of coincidence between the application dates for this specific model (6th, 13th, 20th and 27th of June) and each of the classification rules (rule numbers 1, 2, . . . ) included in the schedule candidates information 124 shown in FIG. 11.

In this case, as shown in FIG. 12, the degree of coincidence between the application dates for the specific model and the classification rule with rule number 7 "Sundays" is calculated to be 1.0. Further, the degree of coincidence between the application dates for the specific model and the classification rule with the rule number 8 "Saturdays and Sundays" is calculated to be 0.5. The schedule generation unit 104 extracts the classification rule "Sundays" showing the highest degree of coincidence, and sets it as an application schedule for this specific model, as shown in FIG. 9.

Consequently, as shown in FIG. 9, the basic model (model name M1) and the specific model (model name M6), and the application schedules for the respective models are set in the model information 123.

As a result, the abnormality detection unit 105 can perform failure detection on a system, applying the basic and specific models set in the model information 123 in accordance with the respective application schedules, with respect to the performance information during the period other than the period used for the model generation, such as newly acquired performance information.

Note that, the abnormality detection unit 105 checks whether the application schedule for each of the specific models in the model information 123 coincides with the date and time on which a failure analysis is performed, and if it coincides, the specific model is applied, and if not, the basic model is applied.

For example, when performing a failure analysis on the newly acquired performance information for July 4 (Sunday), the abnormality detection unit 105 refers to the model information 123 shown in FIG. 9 and performs a failure analysis on the system using the specific model whose application schedule is Sundays (model name M6). When performing a failure analysis on the newly acquired performance information for July 5 (Monday), the abnormality detection unit 105 performs a failure analysis on the system using the basic model (model name M1).

By this way, it is possible to prevent the occurrence of misinformation due to the use of a model inconsistent with the system characteristics on the date of failure analysis, and thereby to perform stable failure analysis.

With that, the operation of the first exemplary embodiment of the present invention is completed.

Figure 1:
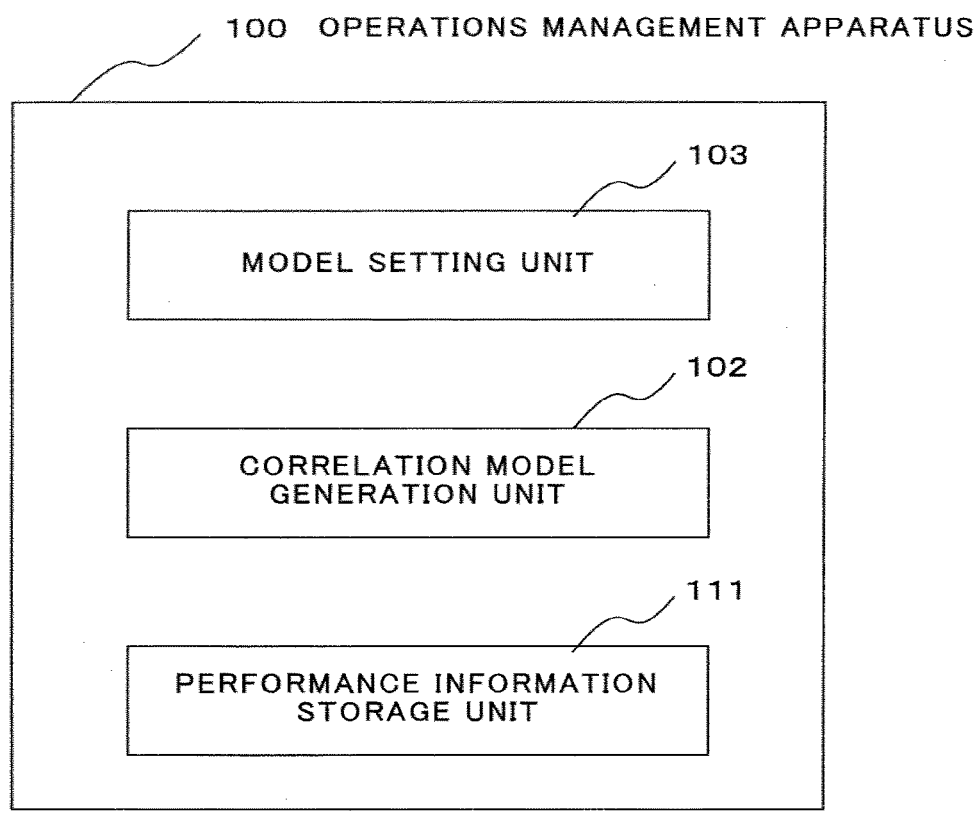
FIG. 1 A block diagram showing a characteristic configuration of a first exemplary embodiment of the present invention.

Next, a characteristic configuration of the first exemplary embodiment of the present invention will be described. FIG. 1 is a block diagram showing a characteristic configuration of the first exemplary embodiment of the present invention.

Referring to FIG. 1, the operations management apparatus 100 includes the performance information storage unit 111, the correlation model generation unit 102 and the model setting unit 103.

Here, the performance information storage unit 111 stores a plurality of pieces of performance information in the system, each in chronological order.

The correlation model generation unit 102 generates a plurality of correlation models 122 each expressing correlations between different types of performance values in a predetermined period, which are stored in the performance information unit 111.

The model setting unit 103 selects, from among the plurality of correlation models 122 generated by the correlation model generation unit 102, a basic model which is a correlation model 122 showing the highest fitting degree and one or more specific models which are correlation models 122 other than the basic model, on the basis of a fitting degree of each of the correlation models 122 for the performance information in the predetermined period, and sets time periods on which the basic model and the specific models are applied respectively to failure detection.

According to the first exemplary embodiment of the present invention, it is possible to generate a correlation model which is appropriate for a failure analysis with respect to each of fixed periods such as the dates on which system analysis is performed, even if the information on modeling periods with respect to system characteristics is not available.

The reason is that, the model setting unit 103 selects, from among the plurality of correlation models 122 generated by the correlation model generation unit 102, on the basis of a fitting degrees of each of the correlation models for the performance information in the predetermined period, a basic model which is the correlation model 122 showing the highest fitting degree and one or more specific models which are the correlation models 122 other than the basic model, and sets the time periods on which the basic model and the specific models are applied respectively to failure detection.

Further, according to the first exemplary embodiment of the present invention, system analysis can be performed also on newly acquired performance information, by using a correlation model appropriate for failure analysis, with respect to each of the fixed periods such as the dates on which the system analysis is performed.

The reason is that the schedule generation unit 104 calculates a degree of coincidence between the fixed periods on which the specific model is applied and each of the classification rules on the basis of the number of coincidences between each of the fixed periods on which the specific model is applied and the classification rules included in the schedule candidates information 124, and generates an application schedule on which the specific model is applied based upon the classification rule having the largest degree of coincidence.

Furthermore, according to the first exemplary embodiment of the present invention, even an administrator having no information specific to the system, such as system characteristics, can perform stable system analysis.

The reason is that, because the schedule generation unit 104 generates the application schedules so as to apply each of the basic and the specific models to appropriate fixed periods, respectively, incorrect detection of system abnormality due to the application of the models inconsistent with the system characteristics may not occur.

Second Exemplary Embodiment

Next, a second exemplary embodiment of the present invention will be described.

In the first exemplary embodiment of the present invention, the correlation model generation unit 102 generates the correlation models 122 with respect to each of the dates (to each of the fixed periods), and the model setting unit 103 determines the basic model and the specific model fitting the performance information from among the correlation models 122, and determines the respective application dates and application schedules for the basic and specific models.

However, in actual systems, system characteristics may change in a specific time slot within a day. In such a case, even if a basic model or a specific model generated by the model setting unit 103 is applied according to their application dates and application schedules, there is a possibility that misinformation occurs in the specific time slot.

To deal with such a problem, in the second exemplary embodiment of the present invention, the operations management apparatus 100 generates an exceptional model to be applied in the specific time slot, with respect to the basic model or the specific model outputted by the model setting unit 103.

Figure 13:
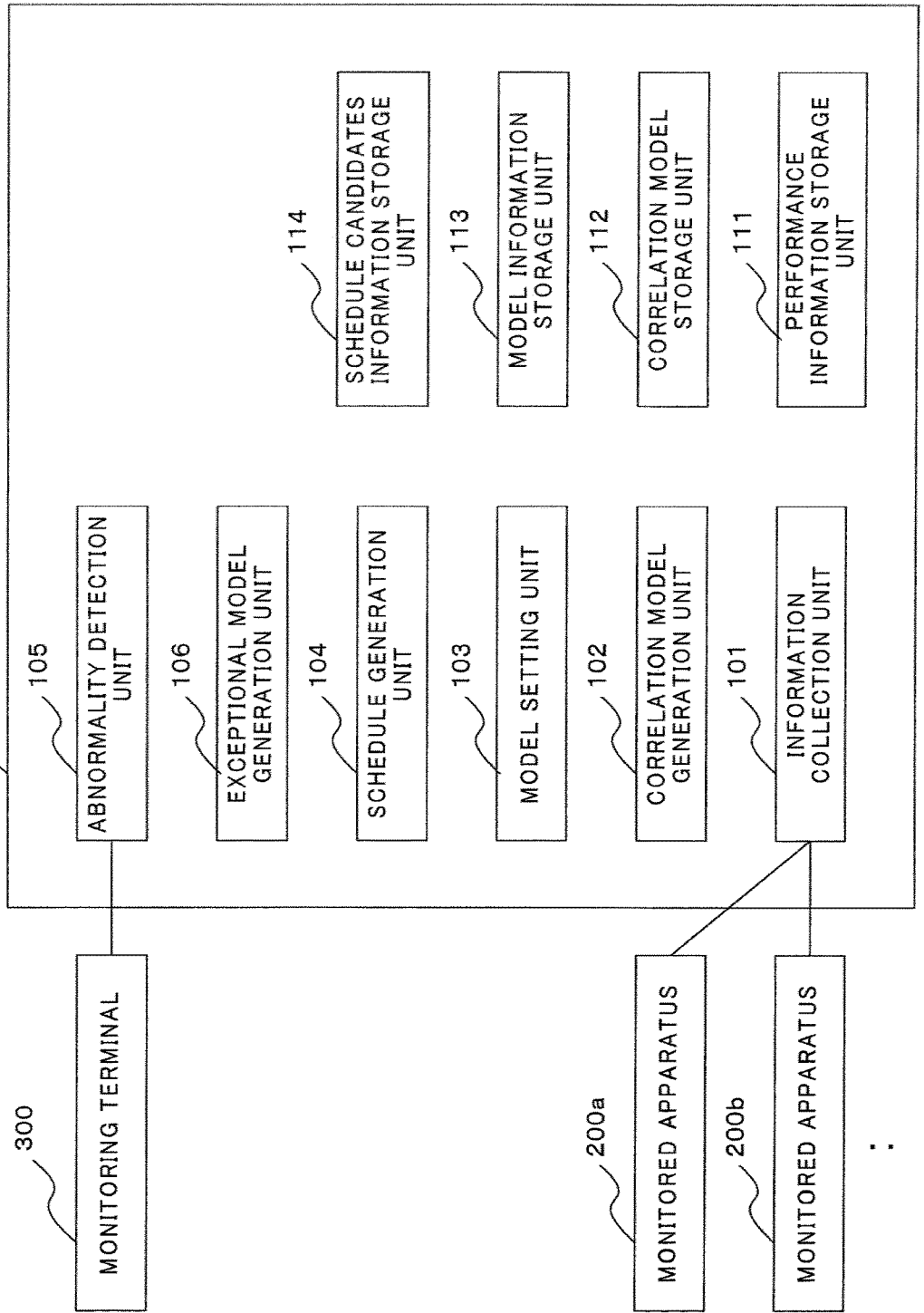
FIG. 13 A block diagram showing a configuration of an operations management system in a second exemplary embodiment of the present invention.

Next, a configuration of the second exemplary embodiment of the present invention will be described. FIG. 13 is a block diagram showing a configuration of an operations management system in the second exemplary embodiment of the present invention.

Referring to FIG. 13, an operations management apparatus 100 of an operations management system in the second exemplary embodiment of the present invention includes an exceptional model generation unit 106 in addition to the configuration of the operations management apparatus 100 in the first exemplary embodiment of the present invention.

The exceptional model generation unit 106 extracts a specific time slot, within the day, in which the applied model does not fit, and generates an exceptional model with respect to the extracted specific time slot, when the basic model or the specific model is applied on one of their application dates.

FIG. 16 is a table showing an example of model information 123 in the second exemplary embodiment of the present invention. The model information 123 includes a model name, a model type, an application date, an application schedule and an application time. Here, the model type indicates that the correlation model 122 is any one of a basic model, a specific model or a exceptional model. The application time indicates the time at which the model is applied.

Next, operation of the operations management apparatus 100 in the second exemplary embodiment of the present invention will be described.

The correlation model generation process, the model extraction process and the schedule generation process performed by the operations management apparatus 100 in the second exemplary embodiment of the present information are identical with that in the first exemplary embodiment of the present invention.

Figure 14:
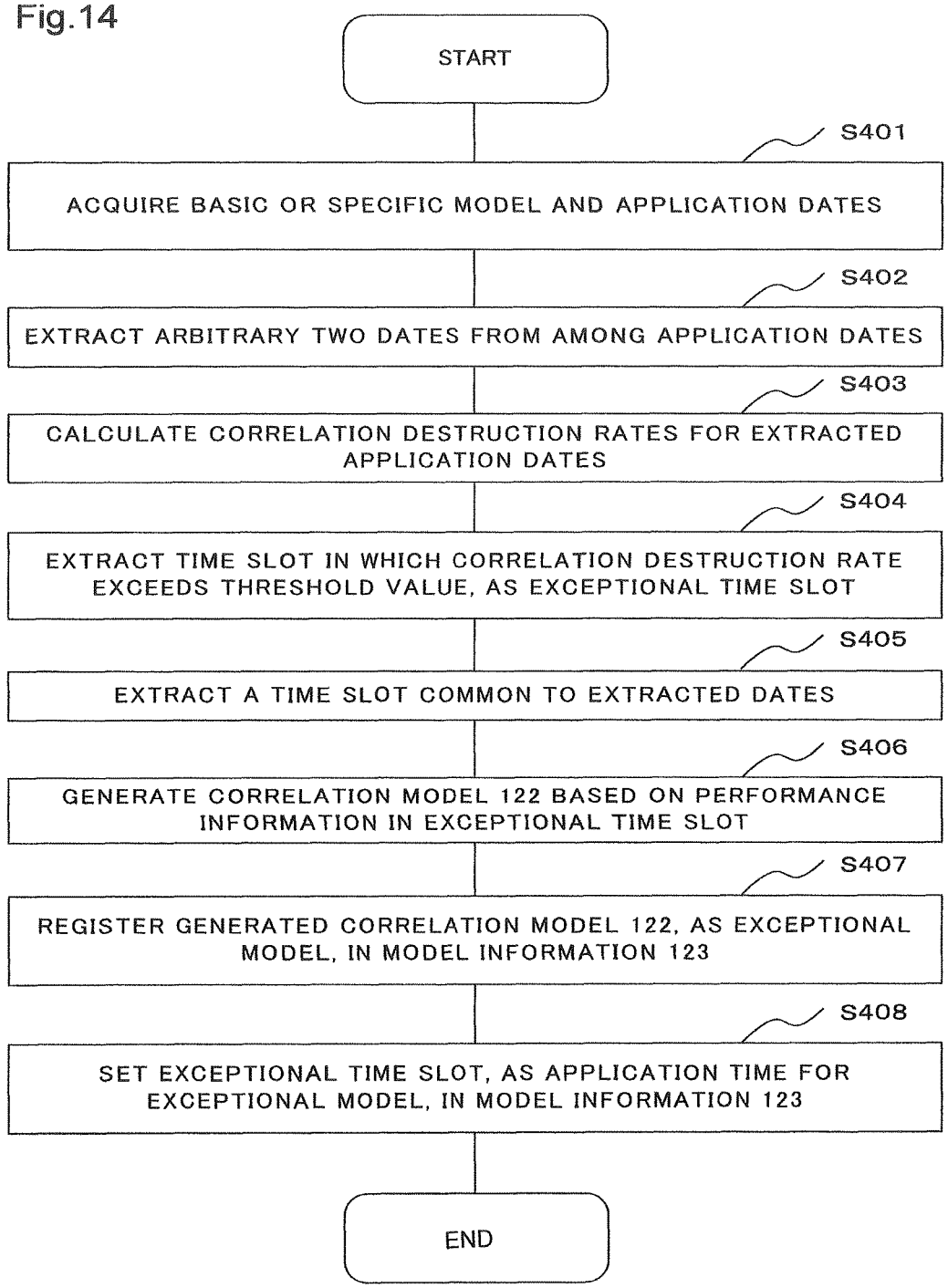
FIG. 14 A flow chart showing an exceptional model generation process of the operations management apparatus 100 in the second exemplary embodiment of the present invention.

Next, an exceptional model generation process performed by the operations management apparatus 100 in the second exemplary embodiment of the present invention will be described. FIG. 14 is a flow chart showing an exceptional model generation process of the operations management apparatus 100 in the second exemplary embodiment of the present invention.

Here, as a result of the schedule generation process in the second exemplary embodiment of the present invention, the model information 123 such as that shown in FIG. 9 is stored in the model information storage unit 113.

The exceptional model generation unit 106 acquires one of the basic model and the specific models and the application dates for the model to be acquired referring to the model information 123 stored in the model information storage unit 113 (step S401).

The exceptional model generation unit 106 extracts arbitrary two dates from among the acquired application dates (step S402).

For example, the exceptional model generation unit 106 acquires the basic model (model name M1) and its application dates referring to the model information shown in FIG. 9, and extracts June 1 and 2 from among the acquired application dates.

The exceptional model generation unit 106 applies the basic or the specific model acquired in step S401 to the performance information for each of the application dates extracted in step S402, included in the performance series information 121, with reference to performance series information 121 stored in the performance information storage unit 111, and calculates a correlation destruction rate for the basic model or the specific model (step S403).

Figure 15:
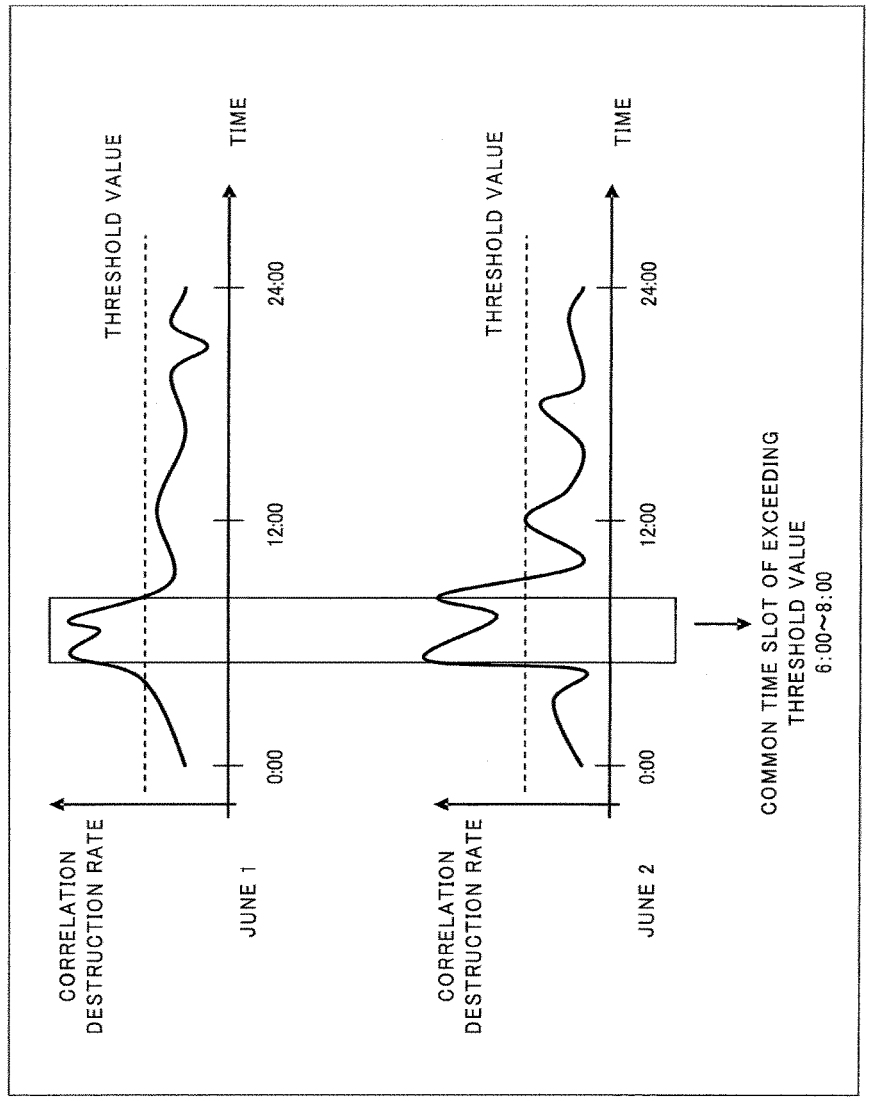
FIG. 15 A diagram showing examples of results of correlation destruction detection in the second exemplary embodiment of the present invention.

FIG. 15 is a diagram showing examples of calculation results of the correlation destruction rate in the second exemplary embodiment of the present invention.

For example, the exceptional model generation unit 106 applies the basic model (model name MD to the performance information for June 1 and that for June 2, calculates the correlation destruction rates and acquires the calculation results shown in FIG. 15.

The exceptional model generation unit 106 detects a time slot in which the correlation destruction rate exceeds a threshold value (a predetermined threshold value) preset by an administrator and the like (a time slot in which the fitting degree is less than a predetermined threshold value), with respect to each of the application dates extracted in step S402 (step S404). As the above-mentioned threshold value, for example, a threshold value of the correlation destruction rate with which the abnormality detection unit 105 detects a system failure is set.

The exceptional model generation unit 106 extracts a common time slot from among the time slots each of which is detected for each of the application date, as an exceptional time slot for which an exceptional model is generated (step S405).

For example, the exceptional model generation unit 106 extracts the time slot from 6:00 to 8:00, which is common to the respective time slots, in which the correlation destruction rate exceeds the threshold value, for June 1 and 2, as an exceptional time slot.

The exceptional model generation unit 106 generates a correlation model 122 on the basis of the performance information in the exceptional time slot of each of the application dates extracted in step S402 included in the performance series information 121, and stores it in the correlation model storage unit 112 (step S406).

For example, the exceptional model generation unit 106 generates the correlation model 122 with the model name M1.1, on the basis of the performance information from 6:00 to 8:00 of June 1 and that of June 2, and stores it in the correlation model storage unit 112.

The exceptional model generation unit 106 registers the model name of the generated correlation model 122, as an exceptional model with respect to the basic or specific model acquired in step S401, in the model information 123 stored in the model information storage unit 113 (step S407).

The exceptional model generation unit 106 sets the exceptional time slot extracted in step S405 in the model information 123, as the application time for the exceptional model (step S408).

For example, the exceptional model generation unit 106 registers the correlation model 122 with the model name M1.1 in the model information 123 as shown in FIG. 16. Further, the exceptional model generation unit 106 registers the time slot from 6:00 to 8:00 in the model information 123, as the application time for the exceptional model with the model name M1.1 as shown in FIG. 16.

Consequently, as shown in FIG. 16, the basic model (model name M1), exceptional model (model name M1.1) and the application times for the respective models are set in the model information 123.

As a result, the abnormality detection unit 105 can perform a failure analysis of a system applying the exceptional model in only the specific time slot designated in the application time for the exceptional model, when applying the basic and specific models set in the model information 123 according to the respective application schedules.

Note that, the abnormality detection unit 105 checks whether the applied model is accompanied with an exceptional model or not when applying the basic model or the specific model stored in the model information 123. If the applied model is accompanied with an exceptional model, the abnormality detection model 105 checks whether the application time for the exceptional model coincides with the time at which an analysis is performed, and applies the exceptional model in the case of coincidence, and applies the basic or the specific model with which the exceptional model is associated in the case of non-coincidence.

For example, the abnormality detection unit 105 refers to the model information 123 shown in FIG. 16, and performs failure analysis of the system using the exceptional model (model name M1.1) associated with the basic model (model name M1) when performing a failure analysis on the performance information newly acquired at 7:00 on Thursday, July 1.

By this way, it is possible to prevent the occurrence of misinformation due to the use of a model inconsistent with the system characteristics in a specific time slot on which a failure analysis is performed, and thereby to perform a stable failure analysis.

With that, the operation of the second exemplary embodiment of the present invention is completed.

In the second exemplary embodiment of the present invention, arbitrary two dates are extracted from among the application dates for the basic or the specific model in step S402, and a time slot in which the correlation destruction rate exceeds a threshold value with respect to both of the extracted dates is extracted as an exceptional time slot. However, the number of the application dates used for extracting an exceptional time slot may be any other numbers being equal to or larger than one and not exceeding the number of the application dates for the corresponding model. Here, when the number of the application dates used for extracting is 1, the time slot in which the correlation destruction rate exceeds a threshold value within the day is assigned as an exceptional time slot.

According to the second exemplary embodiment of the present invention, a system analysis using a correlation model suitable for the analysis is possible even in a time slot in which the system characteristics are exceptional within a fixed period.

The reason is that, the exceptional model generation unit 106 extracts a time slot in which the fitting degree of the basic or the specific model is smaller than a predetermined threshold value, as an exceptional time slot, with respect to a plurality of fixed periods on which the basic model or the specific model is applied, generates a correlation model 122 on the basis of the performance information in the extracted time slot, and outputs it as an exceptional model.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

For example, in the embodiments of the present invention, the fitting degree used for judging whether a correlation model 122 fits the performance information or not is determined on the basis of the correlation destruction rate. However, the fitting degree may be determined on the basis of any measures with which whether a correlation model 122 fits the performance information or not can be judged.

For example, the model setting unit 103 and the exceptional model generation unit 106 may determine the fitting degree according to the number of destructed correlations. In this case, the model setting unit 103 and the exceptional model generation unit 106 calculate the number of destructed correlations by means of the method described in step S201. Accordingly, the model setting unit 103 utilizes the number of destructed correlations in stead of the correlation destruction rate in extracting a basic model in step S202, in extracting a specific model in step S205 and in determining application dates for the specific model in step S207. Also, the exceptional model generation unit 106 utilizes the number of destructed correlations in stead of the correlation destruction rate in detecting a time slot to which the models do not fit in step S404.

Similarly, the model setting unit 103 and the exceptional model generation unit 106 may determine the fitting degree according to a prediction error of a correlation model 122. In this case, the model setting unit 103 and the exceptional model generation unit 106 calculate a prediction error by means of the method described in step S201 and calculate a total value of prediction errors with respect to the correlation functions included in a correlation model 122. Accordingly, the model setting unit 103 utilizes the total value of prediction errors in stead of the correlation destruction rate in the respective steps described above.

This application is based upon and claims the benefit of priority from Japanese Patent Application No. 2010-195761, filed on Sep. 1, 2010, the disclosure of which is incorporated herein in its entirety by reference.

INDUSTRIAL APPLICABILITY

The present invention can be applied to an operations management system which manages performance information of a system.

REFERENCE SIGNS LIST

100 Operations management apparatus
101 Information collection unit
102 Correlation model generation unit
103 Model setting unit
104 Schedule generation unit
105 Abnormality detection unit
106 Exception model generation unit
111 Performance information storage unit
112 Correlation model storage unit
113 Model information storage unit
114 Schedule candidates information storage unit
121 Performance series information
122 Correlation model
123 Model information
124 Schedule candidates information
200 Monitored apparatus
300 Monitoring terminal

What is claimed is:

1. An operations management apparatus comprising:
a performance information storage unit which stores performance information including a plurality of types of performance values in a system, in chronological order, each of said plurality of types indicating a combination of an apparatus and a performance item in said system;
a correlation model generation unit which generates a plurality of correlation models each including a correlation for a pair of different types among said plurality of types of performance values in a predetermined period, which performance values are stored in said performance information storage unit, said pair of different types in one of said plurality of correlation models being the same as said pair of different types in another of said plurality of correlation models; and
a model setting unit which selects, from among said plurality of correlation models generated by said correlation model generation unit, a basic model which is a correlation model showing the highest fitting degree and one or more specific models which are correlation models other than said basic model on the basis of a fitting degree of each of said correlation models for said performance information in said predetermined period, and sets time periods on which said basic model and said one or more specific models are applied respectively to failure detection, wherein
said predetermined period consists of a set of a plurality of fixed periods,
said correlation model generation unit generates individual said correlation models for respective said fixed periods, on the basis of said performance information in said respective said fixed periods, and
said model setting unit selects a predetermined number, which is one or more, of correlation models showing the lowest fitting degree in said redetermined period as said specific models.

2. The operations management apparatus according to claim 1, wherein
said fitting degree of each of said correlation models for said performance information is calculated on the basis of at least one of a destruction rate of said correlations, the number of destructed correlations, and difference from each of said correlation models, which are obtained by applying said correlation model to said performance information.

3. The operations management apparatus according to claim 2, wherein
said fitting degree is calculated on the basis of said destruction rate of said correlations, and
said destruction rate of said correlations is calculated on the basis of the number of destructed correlations which is obtained by applying a correlation function included in said correlation model to a performance value of a first type among said plurality of types stored in said performance information storage unit to calculate a predictive performance value for a performance value of a second type among said plurality of types, calculating a prediction error on the basis of said performance value of said second type and said predictive performance value, and detecting correlation destruction having said prediction error lager than a predetermined value.

4. The operations management apparatus according to claim 1, wherein
said model setting unit calculates said fitting degree of each of said basic model and said specific models for each of said fixed periods, sets one of said fixed periods as a time period on which said one of said specific models is applied when said fitting degree of said one of said specific models for said one of said fixed periods is higher than said fitting degree of said basic model and said fitting degree of each of the other said specific models for said one of said fixed periods, and sets fixed periods other than time periods on which said specific models are applied respectively among from said set of a plurality of fixed periods as time periods on which said basic model is applied.

5. The operations management apparatus according to claim 4, further comprising:
a schedule candidates information storage unit which stores schedule candidates information including classification rules to classify said fixed periods on which said specific models are applied respectively; and
a schedule generation unit which calculates a degree of coincidence, for each of said specific models, between said fixed periods on which said each of said specific models is applied and each of said classification rules on the basis of the number of cases where each of said fixed periods on which said each of said specific models is applied coincides with each of fixed periods indicated by said each of classification rules included in said schedule candidates information, and sets a time period on which said each of specific models is applied on the basis of said classification rule having the largest said degree of coincidence.

6. The operations management apparatus according to claim 4, further comprising
an exceptional model generation unit which extracts an exceptional time slot in one of said fixed periods on which said basic model or one of said specific models is applied, said exceptional time slot being a time slot in which said fitting degree of said basic model or one of said specific models is smaller than a predetermined threshold value, generates said correlation model for said exceptional time slot on the basis of said performance information in said exceptional time slot in said one of said fixed periods as an exceptional model for said basic model or said one of specific models, and sets said exceptional time slot as a time slot on which said exceptional model is applied.

7. The operations management apparatus according to claim 6, wherein,
said exceptional model generation unit extracts individual time slots in respective said fixed periods on which said basic model or one of said specific models is applied, said fitting degree of said basic model or said one of said specific models being smaller than said predetermined threshold value in said individual time slots, extracts a time slot common to said individual time slots as said exceptional time slot, and generates said correlation model for said exceptional time slot on the basis of said performance information in said exceptional time slot.

8. An operations management method comprising:
storing performance information including a plurality of types of performance values in a system, in chronological order, each of said plurality of types indicating a combination of an apparatus and a performance item in said system;
generating a plurality of correlation models each including a correlation for a pair of different types among said plurality of types of performance values in a predetermined period, which performance values are stored, said pair of different types in one of said plurality of correlation models being the same as said pair of different types in another of said plurality of correlation models;
selecting, from among said plurality of correlation models generated, a basic model which is a correlation model showing the highest fitting degree and one or more specific models which are correlation models other than said basic model on the basis of a fitting degree of each of said correlation models for said performance information in said predetermined period; and
setting time periods on which said basic model and said one or more specific models are applied respectively to failure detection, wherein
said predetermined period consists of a set of a plurality of fixed periods, said generating a plurality of correlation models generates individual said correlation models for respective said fixed periods, on the basis of said performance information in said respective said fixed periods, and
said selecting one or more specific models selects a predetermined number, which is one or more, of correlation models showing the lowest fitting degree in said predetermined period as said specific models.

9. The operations management method according to claim 8, wherein
said fitting degree of each of said correlation models for said performance information is calculated on the basis of at least one of a destruction rate of said correlations, the number of destructed correlations, and difference from each of said correlation models, which are obtained by applying said correlation model to said performance information.

10. The operations management method according to claim 9, wherein
said fitting degree is calculated on the basis of said destruction rate of said correlations, and said destruction rate of said correlations is calculated on the basis of the number of destructed correlations which is obtained by applying a correlation function included in said correlation model to a performance value of a first type among said plurality of types to calculate a predictive performance value for a performance value of a second type among said plurality of types, calculating a prediction error on the basis of said performance value of said second type and said predictive performance value, and detecting correlation destruction having said prediction error lager than a predetermined value.

11. The operations management method according to claim 8, wherein
said setting time periods on which said basic model and said one or more specific models are applied calculates said fitting degree of each of said basic model and said specific models for each of said fixed periods, sets one of said fixed periods as a time period on which said one of said specific models is applied when said fitting degree of said one of said specific models for said one of said fixed periods is higher than said fitting degree of said basic model and said fitting degree of each of the other said specific models for said one of said fixed periods, and sets fixed periods other than time periods on which said specific models are applied respectively among from said set of a plurality of fixed periods as time periods on which said basic model is applied.

12. The operations management method according to claim 11, further comprising:
storing schedule candidates information including classification rules to classify said fixed periods on which said specific models are applied respectively;
calculating a degree of coincidence, for each of said specific models, between said fixed periods on which said each of said specific models is applied and each of said classification rules on the basis of the number of cases where each of said fixed periods on which said each of said specific models is applied coincides with each of fixed periods indicated by said each of classification rules included in said schedule candidates information; and
setting a time period on which said each of specific models is applied on the basis of said classification rule having the largest said degree of coincidence.

13. The operations management method according to claim 11, further comprising:
extracting an exceptional time slot in one of said fixed periods on which said basic model or one of said specific models is applied, said exceptional time slot being a time slot in which said fitting degree of said basic model or one of said specific models is smaller than a predetermined threshold value;
generating said correlation model for said exceptional time slot on the basis of said performance information in said exceptional time slot in said one of said fixed periods as an exceptional model for said basic model or said one of specific models; and
setting said exceptional time slot as a time slot on which said exceptional model is applied.

14. The operations management method according to claim 13, wherein,
said generating an exceptional model extracts individual time slots in respective said fixed periods on which said basic model or one of said specific models is applied, said fitting degree of said basic model or said one of said specific models being smaller than said predetermined threshold value in said individual time slots, extracts a time slot common to said individual time slots as said exceptional time slot, and generates said correlation model for said exceptional time slot on the basis of said performance information in said exceptional time slot.

15. A non-transitory computer readable storage medium recording thereon a operations management program, causing a computer to perform a method comprising:
   storing performance information including a plurality of types of performance values in a system, in chronological order, each of said plurality of types indicating a combination of an apparatus and a performance item in said system;
   generating a plurality of correlation models each including a correlation for a pair of different types among said plurality of types of performance values in a predetermined period, said pair of different types in one of said plurality of correlation models being the same as said pair of different types in another of said plurality of correlation models;
   selecting, from among said plurality of correlation models, a basic model which is a correlation model showing the highest fitting degree and one or more specific models which are correlation models other than said basic model on the basis of a fitting degree of each of said correlation models for said performance information in said predetermined period; and
   setting time periods on which said basic model and said one or more specific models are applied respectively to failure detection, wherein
   said predetermined period consists of a set of a plurality of fixed periods,
   said generating a plurality of correlation models generates individual said correlation models for respective said fixed periods, on the basis of said performance information in said respective said fixed periods, and
   said selecting one or more specific models selects a predetermined number, which is one or more, of correlation models showing the lowest fitting degree in said predetermined period as said specific models.

16. The non-transitory computer readable storage medium according to claim 15, recording thereon said operations management program, wherein
   said fitting degree of each of said correlation models for said performance information is calculated on the basis of at least one of a destruction rate of said correlations, the number of destructed correlations, and difference from each of said correlation models, which are obtained by applying said correlation model to said performance information.

17. The non-transitory computer readable storage medium according to claim 16, recording thereon said operations management program, wherein
   said fitting degree is calculated on the basis of said destruction rate of said correlations, and
   said destruction rate of said correlations is calculated on the basis of the number of destructed correlations which is obtained by applying a correlation function included in said correlation model to a performance value of a first type among said plurality of types to calculate a predictive performance value for a performance value of a second type among said plurality of types, calculating a prediction error on the basis of said performance value of said second type and said predictive performance value, and detecting correlation destruction having said prediction error lager than a predetermined value.

18. The non-transitory computer readable storage medium according to claim 15, recording thereon said operations management program, wherein
   said setting time periods on which said basic model and said one or more specific models are applied calculates said fitting degree of each of said basic model and said specific models for each of said fixed periods, sets one of said fixed periods as a time period on which said one of said specific models is applied when said fitting degree of said one of said specific models for said one of said fixed periods is higher than said fitting degree of said basic model and said fitting degree of each of the other said specific models for said one of said fixed periods, and sets fixed periods other than time periods on which said specific models are applied respectively among from said set of a plurality of fixed periods as time periods on which said basic model is applied.

19. The non-transitory computer readable storage medium according to claim 18, recording thereon said operations management program, further comprising:
   storing schedule candidates information including classification rules to classify said fixed periods on which said specific models are applied respectively;
   calculating a degree of coincidence, for each of said specific models, between said fixed periods on which said each of said specific models is applied and each of said classification rules on the basis of the number of cases where each of said fixed periods on which said each of said specific models is applied coincides with each of fixed periods indicated by said each of classification rules included in said schedule candidates information; and
   setting a time period on which said each of specific models is applied on the basis of said classification rule having the largest said degree of coincidence.

20. The non-transitory computer readable storage medium according to claim 18, recording thereon said operations management program, further comprising:
   extracting an exceptional time slot in one of said fixed periods on which said basic model or one of said specific models is applied, said exceptional time slot being a time slot in which said fitting degree of said basic model or one of said specific models is smaller than a predetermined threshold value;
   generating said correlation model for said exceptional time slot on the basis of said performance information in said exceptional time slot in said one of said fixed periods as an exceptional model for said basic model or said one of specific models; and
   setting said exceptional time slot as a time slot on which said exceptional model is applied.

21. The non-transitory computer readable storage medium according to claim 20, recording thereon said operations management program, wherein,
   said generating an exceptional model extracts individual time slots in respective said fixed periods on which said basic model or one of said specific models is applied, said fitting degree of said basic model or said one of said specific models being smaller than said predetermined threshold value in said individual time slots, extracts a time slot common to said individual time slots as said exceptional time slot, and generates said correlation model for said exceptional time slot on the basis of said performance information in said exceptional time slot.

22. An operations management apparatus comprising:

performance information storage unit configured for storing performance information including a plurality of types of performance values in a system, in chronological order, each of said plurality of types indicating a combination of an apparatus and a performance item in said system;

correlation model generation unit configured for generating a plurality of correlation models each including a correlation for a pair of different types among said plurality of types of performance values in a predetermined period, which performance values are stored in said performance information storage unit, said pair of different types in one of said plurality of correlation models being the same as said pair of different types in another of said plurality of correlation models; and model setting unit configured for selecting, from among said plurality of correlation models generated by said correlation model generation unit, a basic model which is a correlation model showing the highest fitting degree and one or more specific models which are correlation models other than said basic model on the basis of a fitting degree of each of said correlation models for said performance information in said predetermined period, and setting time periods on which said basic model and said one or more specific models are applied respectively to failure detection, wherein said predetermined period consists of a set of a plurality of fixed periods, said correlation model generation unit is configured for generating individual said correlation models for respective said fixed periods, on the basis of said performance information in said respective said fixed periods, and said model setting unit is configured for selecting a predetermined number, which is one or more, of correlation models showing the lowest fitting degree in said predetermined period as said specific models.

* * * * *